United States Patent
Zen et al.

[11] Patent Number: 5,855,760
[45] Date of Patent: Jan. 5, 1999

[54] PROCESS FOR ELECTROCHEMICAL DECOMPOSITION OF ORGANIC POLLUTANTS

[76] Inventors: Jyh-Myng Zen, 11th Fl., No. 612, Wu Chuan S. Rd., Tai Chung City; Yao-Jung Chen, No. 131, Ai Hsin Rd., Ta Li City, Tai Chung Hsien, both of Taiwan

[21] Appl. No.: 840,645

[22] Filed: Apr. 25, 1997

[51] Int. Cl.[6] .............................. C25B 1/00; B01D 17/06; A62D 3/00
[52] U.S. Cl. ......................... 205/555; 205/687; 205/696; 205/697; 588/205; 588/206; 588/210; 588/212; 588/219; 588/220
[58] Field of Search ..................................... 205/465, 478, 205/555, 687, 697, 696; 588/205, 210, 212, 206, 219, 222

[56] References Cited

U.S. PATENT DOCUMENTS

| | | | |
|---|---|---|---|
| 4,468,297 | 8/1984 | Sawyer et al. | 204/59 R |
| 4,702,804 | 10/1987 | Mazur et al. | 588/210 |
| 5,545,799 | 8/1996 | Ritter | 588/200 |
| 5,569,809 | 10/1996 | Gui | 588/212 |

*Primary Examiner*—Kathryn L. Gorgos
*Assistant Examiner*—Edna Wong
*Attorney, Agent, or Firm*—Bacon & Thomas

[57] ABSTRACT

There are disclosed a process for the electrochemical decomposition of organic pollutants in an acidic solution to carbon dioxide performed in a electrochemical system comprising a working electrode and an auxiliary electrode with oxygen at ambient temperature and at a reductive potential or current, wherein the working electrode used is a graphite-containing electrode.

22 Claims, 2 Drawing Sheets

PROCESS FOR ELECTROCHEMICAL DECOMPOSITION OF ORGANIC POLLUTANTS

BACKGROUND OF THE INVENTION

This invention relates to a process for the electrochemical decomposition of organic pollutants to carbon dioxide.

The presence of industrial chemicals, manufacturing wastes, and other unwanted chemicals in water and of pesticides on land and in crops has convinced the public that pollution by synthetic organic molecules is a problem of major importance.

U.S. Pat. No. 5,545,799 discloses a process for chemical destruction of toxic organic compounds by using hydrogen peroxide as an oxidizing agent in the preselected ranges of the temperature and the pH, e.g., about 50° C. to about 90° C., and the pH starting at about 1 to about 2 and terminating at about 5 to about 8 during the oxidation, and then finishing decomposition of the oxidation product of the original toxic organic compound at an alkaline pH, e.g., to a maximum final pH of about 11.

Japan Pat. No. 07265862 A2 discloses an apparatus for oxidation decomposition of organic substances in water by electrolysis. The apparatus includes an electrolysis tank having anode plates and cathode plates (made of graphite) with activated carbon filled between two electrodes. The electrolysis is carried out by adding iron salt and hydrogen peroxide into wastewater to be electrolyzed at low voltage and high current.

In view of an ideal method for decomposition of organic pollutants, the following aspects must be fully concerned. 1) The efficiency of decomposition of organic pollutants to carbon dioxide and inorganics without increasing the volume of the waste, the formation of new toxicants, and/or the biosynthesis of persistent products. 2) The mild, easy, and safe condition for controlling the operating process of environmental cleanup. 3) Aversatile process that can treat multiple kinds of organic pollutants using the same equipment in view of the economic reason. For these reasons, establishment of an excellent industrial method for decomposition of organic pollutants has been desired promptly.

SUMMARY OF THE INVENTION

An object of the present invention is to provide a novel process for the electrochemical decomposition of organic pollutants to carbon dioxide with ease, safe, economy, and without secondary waste treatment.

The present invention provides a process for the decomposition of an organic compound selected from aliphatic hydrocarbons, aromatic hydrocarbons, halogenated aliphatics, halogenated aromatics, aliphatic oxo-compounds, aromatic oxo-compounds, nitrogen-containing aliphatic compounds, nitrogen-containing aromatic compounds, sulfur-containing aliphatic compounds, and sulfur-containing aromatic compounds comprising: (a) putting said organic compound in an acidic solution to become a reaction solution at a pH value of less than 7; and (b) using an electrolytic system having a working electrode, said working electrode is a graphite-contained electrode, to electrolyze said reaction solution in the presence of an oxygen-contained gas and at a reductive potential or current.

The present invention provides a process for the electrochemical decomposition of organic pollutants such as following:
1) Halogenated aromatics: for examples, 2,4,6-trichlorophenol, pentachlorophenol, 2,3,4,5-tetrachlorobiphenyl, other polychlorinated biphenyls (PCBs), dioxins, et al.
2) Halogenated aliphatics: for examples, 1,2-dichloroethane, polyvinyl chloride (PVC), Lindane, Aldrin, et al.
3) Aliphatic and aromatic oxo-compounds representing as aldehydes, ketones, phenols, alcohols, ethers, amides, carboxylic acids and their esters: for examples, 2-nitrophenol, 4-hydroxybenzoic acid, 4-chlorocresol, 4-chloroanisole, phthalates, maleic acids, acetic acids, fatty acids, chloromethyl methyl ether, N,N-dimethylformamide (DMF), ethylene glycol, formalin, 2-butanone (MEK), 2-(2-thiazolylazo)-p-cresol, et al.
4) Aliphatic and aromatic hydrocarbons: for examples, heptane, polyethylene, benzene, toluene, naphthalene, polycyclic aromatic hydrocarbons (PAHs), et al.
5) Nitrogen-containing organic compounds: for examples, aniline, 4-aminophenol, benzidine, pyridine, acetonitrile, nitrobenzene, 2-nitrobenzoic acid, 2-(2-thiazolylazo)-p-cresol, paraquat, et al.
6) Sulfur-containing compounds: for examples, dimethylsulfoxide (DMSO), dimethyl sulfide, thiophenol, toluenesulfonic acid, 2-(2-thiazolylazo)-p-cresol et al.

The electrolytic process can be carried out in a three-electrode system involving a working electrode, a reference electrode, and an auxiliary electrode, or in a two-electrode system without including a reference electrode. A working electrode can be any kind of graphite-containing electrodes such as graphite electrode, glassy carbon electrode, carbon wire electrode, et al, or any kind of modified graphite electrodes which modified by using catalysts such as ruthenium-oxide pyrochlore, any other kinds of ferric or ferrous complex, and any other kinds of ruthenium complex, preferably used is a graphite electrode.

As a solvent for the reaction, preferably used is water or water mixed with few amounts of organic solvent to increase the solubility of organic pollutants in the reaction solution as well as the rate of decomposition reaction. Organic solvents can be selected from the group consisting of acetonitrile, acetone, N,N-dimethylformamide (DMF), dimethylsulfoxide, et al. Among them, acetonitrile is preferably used.

A reaction temperature is generally from 5° to 80° C., preferably at ambient temperature. The decomposition rate increases by increasing the temperature. If the temperature is too high, low efficiency for the decomposition of high volatile organic materials is to be observed. To the contrary, if the temperature is too low, the efficiency of the decomposition becomes low due to the decrease of solubility of organic compounds to an aqueous solvent and due to lowering the rate of the decomposition reaction.

A reaction time is varied with the different kinds of organic compounds and the reaction conditions. The longer the reaction time is, the more completed the decomposition reaction is. If the reaction time is too short, the reaction is insufficient whereby the efficiency of the decomposition lowers. On the other hand, if the reaction time is too long, a ratio of conversion per unit time lowers so that it is of no use.

The reaction solution is generally controlled at an acidic pH, preferably from pH=0.5 to 6. The rate of decomposition reaction is increased by increasing the acidity of the reaction solution. Among them, the acidity is particularly preferably controlled at pH=1. The reaction solution is adjusted to a desired pH value generally with inorganic acids such as sulfuric acid, hydrochloric acid, nitric acid, phosphoric acid, perchloric acid, et al, especially preferably hydrochloric acid. On the other hand, an inorganic acid in the reaction solution also acts as a supporting electrolyte. Other commonly used supporting electrolytes such as sodium chloride, potassium chloride, et al also can be added into the reaction solution to increase the rate of decomposition.

As a sequential oxidation decomposition of organic pollutants, the oxidants are to be electrochemically generated from reduction of oxygen simultaneously and continuously under electrolyzed conditions without adding any other reagents (e.g. hydrogen peroxide, ozone, or other common oxidants) and catalysts (e.g. Fe, Cu, Ni, or other metal complex). However, the addition of oxidizing agents and/or metal catalysts to the electrolyzed solution may increase the efficiency of the decomposition, but it is less economic, unsafe, and needs secondary waste treatment. On the contrary, a process using oxygen as a source of oxidizing agents is more safe, economic, easy, and without generation of secondary wastes, especially in view of the operation concerned. As a key source of oxidants in the electrolytic reaction, oxygen or air is to be bubbled into the reaction solution continuously to keep the efficiency of the decomposition process.

In the oxidation decomposition of organic pollutants, the electrolyzed reaction condition in a three-electrode system is normally carried out at a constantly reductive potential in the range of −0.1 to −1.2 V (vs Ag/AgCl), preferably −0.3 to −1.0 V. If a reductive potential is too low, the efficiency of decomposition reaction to be obtained lowers as well as the reaction time becomes longer. To the contrary, if a reductive potential is excessively high, water and other chemicals (e.g. sulfate) in the reaction vessel may be involved in the electrolyzed reaction to affect the efficiency of decomposition reaction. For example, water may be oxidized to oxygen in the anode at −1.0 V, which oxygen can be reused as a source of oxidizing agents. As an electrochemical decomposition process, a constant reduction current used may be as well as a constant reduction potential. A higher reduction current is used, a higher efficiency of the decomposition reaction is to be obtained. In this invention, a constant reduction current is maintained at below 2 A, preferably 100 mA to 1 A. In view of iR-drop concerned in an electrolyzed process, the electrolytic reaction is to be used with or without iR-compensation.

To determine the efficiency of the electrochemical decomposition of organic pollutants to carbon dioxide, the gaseous product of the electrolyzed reaction is trapped by 0.1N NaOH aqueous solution which presumably converts carbon dioxide to carbonate ion. For a specific reaction time, a certain amount of barium chloride dihydrate is added to the trapping vessel of sodium hydroxide aqueous solution to form a white precipitate of barium carbonate. After filtered and dried, the precipitate of barium carbonate is weighted. Then, the yield of carbon dioxide is to be obtained and the efficiency for the electrochemical decomposition of organic pollutants is determined on the basis of this yield.

DETAILED DESCRIPTION OF THE PREFERRED EMBODIMENT

Figure 1:
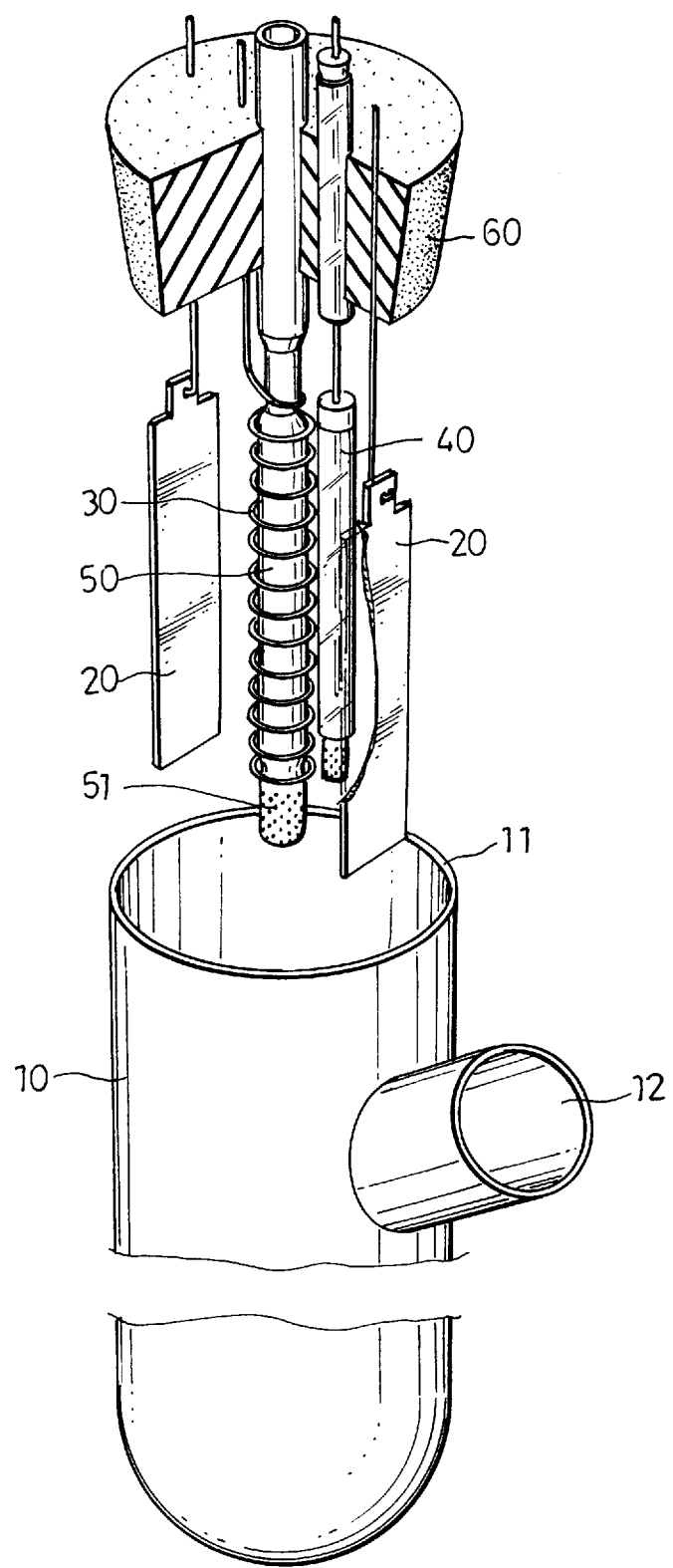
FIG. 1 is an exploded view of an electrolytic apparatus according to the present invention.

Referring to FIG. 1, an electrolytic system in accordance with the present invention is generally comprised of an electrolytic cell 10, two graphite working electrodes 20, an auxiliary electrode 30, and a reference electrode 40.

The graphite working electrodes 20 can be made from unmodified graphite or modified graphite. The reference electrode 40 can be Ag/AgCl, Hg/Hg$_2$SO$_4$, etc. The auxiliary electrode 30 can be a platinum electrode wound round an air tube 50. The air tube 50 is mounted with a porous ceramic element 51 through which a gas (oxygen or air) is delivered to the electrolytic cell 10. The electrolytic cell 10 has a top opening 11 sealed by a silicon rubber stopper 60, and an exhaust port 12 at one side for exhaust of air.

Figure 2:
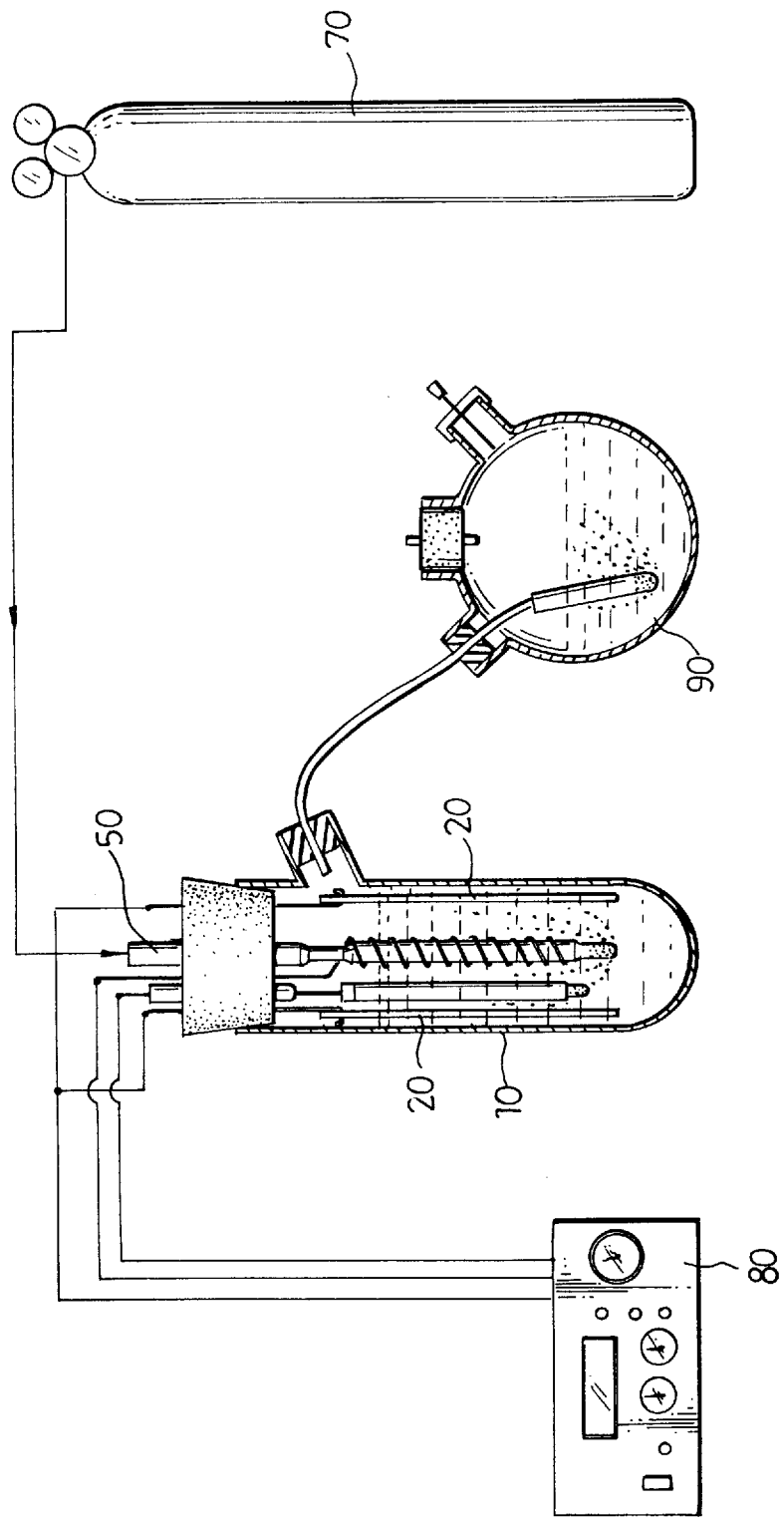
FIG. 2 shows an electrolytic system according to the present invention.

Referring to FIG. 2, reaction solution (organic compound in an acidic solution) is poured into the electrolytic cell 10, oxygen is delivered from an oxygen cylinder 70 through the air tube 50 into the electrolytic cell 10, and an electrochemical analyzer ( for example HA-151) 80 is operated to control the electrodes and to employ a reduction potential to the graphite working electrodes 20. When a reduction potential is employed to the graphite working electrodes 20, organic compound is decomposed, and carbon dioxide is produced and guided to a three-necked flask 90. The three-necked flask 90 contains an alkaline solution for example 0.1M NaOH for collecting carbon dioxide. Barium chloride water solution is then added to the alkaline solution in the three-necked flask 90, causing a barium carbonate sediment to be produced, and therefore the yield of carbon dioxide is determined.

The invention is illustrated but in no way limited by the following examples. In all examples, yields of carbon dioxide are shown by the value based on moles of carbon content of organic compounds.

EXAMPLE 1

In 70 ml of deionized water was placed 77.4 mg (0.56 mmole) of 4-hydroxybenzoic acid, and the mixture was adjusted to pH=1 by using a 6N HCl aqueous solution to become an approximate 8 mM of reaction solution. The above solution was transferred to a home-made electrochemical cell. The working electrode was two pieces of graphite electrodes. The potential was maintained constantly at −0.3 V vs Ag/AgCl without iR-compensation. During the electrolysis at ambient temperature, dioxygen gas was bubbled continuously and the gas product of carbon dioxide was trapped by 80 ml of 0.1N NaOH aqueous solution. After the reaction solution was electrolyzed for 9 h, barium chloride dihydrate (960 mg) was added in the trapping vessel of NaOH aqueous solution and the mixture was stirred for 20 min to form a white precipitate crystal. After filtered off by suction, the precipitate was washed with water and then dried in oven at 102° C. for 3 h. to give 599 mg of barium carbonate, in which the yield of carbon dioxide obtained is 77%.

EXAMPLE 2

The procedure of example 1 was repeated except that the potential was maintained at −0.1 V. Barium carbonate (368 mg) was obtained and the yield of carbon dioxide is 48%.

EXAMPLE 3

The procedure of example 1 was repeated except that the bubbling gas used was air instead of dioxygen gas. Barium carbonate (746 mg) was obtained and the yield of carbon dioxide is 97%.

EXAMPLE 4

The procedure of example 1 was repeated except that 18N H$_2$SO$_4$ aqueous solution was used to adjust the pH value to 1 instead of 6N HCl aqueous solution. Barium carbonate (243 mg) was obtained and the yield of carbon dioxide is 31%.

EXAMPLE 5

The procedure of example 4 was repeated except that 410 mg of sodium chloride was added in the reaction solution. Barium carbonate (419 mg) was obtained and the yield of carbon dioxide is 54%.

EXAMPLE 6

The procedure of example 1 was repeated except that the potential was maintained at −0.6 V with iR compensation. Barium carbonate (130 mg) was obtained and the yield of carbon dioxide is 17%.

EXAMPLE 7

The procedure of example 6 was repeated except that the reaction was carried out at pH=0.5 instead of pH=1. Barium carbonate (343 mg) was obtained and the yield of carbon dioxide is 44%.

EXAMPLE 8

The procedure of example 1 was repeated except that the potential was maintained at −1.0 V with iR compensation. Barium carbonate (702 mg) was obtained and the yield of carbon dioxide is 91%.

EXAMPLE 9

The procedure of example 1 was repeated except that a constant potential was changed to a constant current maintained at −800 mA with iR compensation and pH was adjusted to 0.5by using 12 N HCl solution. Barium carbonate (492 mg ) was obtained and the yield of carbon dioxide is 64%.

EXAMPLE 10

In 70 ml of deionized water was suspended 111 mg (0.56 mmole) of 2,4,6-trichlorophenol, and the mixture was adjusted to pH=1 by using a 6N HCl aqueous solution to become an approximate 8 mM of reaction solution. The above solution was transferred to a home-made electrochemical cell. The working electrode was two pieces of graphite electrodes. The potential was maintained constantly at −0.8 V with iR-compensation. During the electrolysis at ambient temperature, dioxygen gas was bubbled continuously and the gas product of carbon dioxide was trapped by 68 ml of 0.1N NaOH aqueous solution. After the reaction solution was electrolyzed for 9 h, 821 mg of barium chloride dihydrate was added in the trapping vessel of NaOH aqueous solution and the mixture was stirred for 20 min to form a white precipitate crystal. After filtered off by suction, the precipitate was washed with water and then dried in oven at 102° C. for 3 h. to give 332 mg of barium carbonate, in which yield of carbon dioxide obtained is 50%.

EXAMPLE 11

The procedure of example 9 was repeated except that two pieces of graphite electrodes were used as the working electrode. Barium carbonate (528 mg) was obtained and the yield of carbon dioxide is 80%.

EXAMPLE 12

To 52.5 ml of deionized water was added a solution of 111 mg (0.56 mmole) of 2,4,6-trichlorophenol in 17.5 ml of acetonitrile, and the mixture was adjusted to pH=1 by using a 6N HCl aqueous solution to become an approximate 8 mM of reaction solution. The above solution was transferred to a home-made electrochemical cell. The working electrode was two pieces of graphite electrodes. The potential was maintained constantly at −0.3 V without iR-compensation. During the electrolysis at ambient temperature, dioxygen gas was bubbled continuously and the gas product of carbon dioxide was trapped by 470 ml of 0.1N NaOH aqueous solution. After the reaction solution was electrolyzed for 2 h, 5.74 g of barium chloride dihydrate was added in the trapping vessel of NaOH aqueous solution and the mixture was stirred for 20 min to form a white precipitate crystal. After filtered of by suction, the precipitate was washed with water and then dried in oven at 102° C. for 3 h. to give 875 mg of barium carbonate, in which yield of carbon dioxide obtained is 132%.

EXAMPLE 13

The procedure of example 12 was repeated except that 149 mg of pentachlorophenol was treated instead of 2,4,6-trichlorophenol. Barium carbonate (368 mg) was obtained and the yield of carbon dioxide is 56%.

EXAMPLE 14

The procedure of example 1 was repeated except that 600 mg of acetic acid was treated instead of 4-hydroxybenzoic acid. The concentration of reaction was approximate 0.143 M and 400 ml of 0.1 N NaOH aqueous solution was used to trap carbon dioxide. After the reaction solution was electrolyzed for 9 h, 4.89 g of barium chloride dihydrate was added in the trapping vessel of NaOH aqueous solution to give 2.21 g of the precipitate of barium carbonate after the same workup procedure described in example 1. The yield of carbon dioxide is 56%.

EXAMPLE 15

The procedure of example 1 was repeated except that 72 mg of naphthalene was treated instead of 4-hydroxybenzoic acid and 115 ml of 0.1N NaOH aqueous solution was used to trap carbon dioxide. After the reaction solution was electrolyzed for 9 h, 1.368 g of bariumchloride dihydrate was added in the trapping vessel of NaOH aqueous solution to give 500 mg of the precipitate of barium carbonate after the same workup procedure described in example 1. The yield of carbon dioxide is 45%.

EXAMPLE 16

The procedure of example 1 was repeated except that 25 mg of 2,3,4,5-tetrachlorobiphenyl was treated instead of 4-hydroxybenzoic acid. The concentration of reaction was approximate 1.22 mM and 45 ml of 0.05N NaOH aqueous solution was used to trap carbon dioxide. After the reaction solution was electrolyzed for 72 h, 251 mg of barium chloride dihydrate was added in the trapping vessel of NaOH aqueous solution to give 124 mg of barium carbonate after the same workup procedure described in example 1. The yield of carbon dioxide is 61%.

EXAMPLE 17

The procedure of example 1 was repeated except that 89 mg of p-chloroanisole was treated instead of 4-hydroxybenzoic acid and 80 ml of 0.1N NaOH aqueous solution was used to trap carbon dioxide. After the reaction solution was electrolyzed for 9 h, 0.96 g of barium chloride dihydrate was added in the trapping vessel of NaOH aqueous solution to give 190 mg of barium carbonate after the same workup procedure described in example 1. The yield of carbon dioxide is 25%.

EXAMPLE 18

The procedure of example 1 was repeated except that 52 mg of aniline was treated instead of 4-hydroxybenzoic acid and 68 ml of 0.1N NaOH aqueous solution was used to trap carbon dioxide. After the reaction solution was electrolyzed for 9 h, 0.821 g of barium chloride dihydrate was added in the trapping vessel of NaOH aqueous solution to give 241 mg of barium carbonate after the same workup procedure described in example 1. The yield of carbon dioxide is 36%.

EXAMPLE 19

The procedure of example 1 was repeated except that 500 mg of dimethylsulfoxide was treated instead of 4-hydroxybenzoic acid. The concentration of reaction was approximate 91 mM and 100 ml of 0.1N NaOH aqueous solution was used to trap carbon dioxide. After the reaction solution was electrolyzed for 23 h, 3.12 g of barium chloride dihydrate was added in the trapping vessel of NaOH aqueous solution to give 215 mg of barium carbonate after the same workup procedure described in example 1. The yield of carbon dioxide is 9%.

EXAMPLE 20

The procedure of example 19 was repeated except that the reaction time was 43 h instead of 9 h and 100 ml of 0.1N NaOH aqueous solution was used to trap carbon dioxide. Barium carbonate (3.048 g) was obtained and the yield of carbon dioxide is 75%.

EXAMPLE 21

The procedure of example 1 was repeated except that 94 mg of 2-nitrobenzoic acid was treated instead of 4-hydroxybenzoic acid and the potential was maintained at —0.8 V with iR compensation. Barium carbonate (625 mg) was obtained and the yield of carbon dioxide is 81%.

EXAMPLE 22

The procedure of example 20 was repeated except that 44 mg of pyridine was treated instead of 2-nitrobenzoic acid, 56 ml of 0.1N NaOH aqueous solution was used to trap carbon dioxide, and 684 mg of barium chloride dihydrate was added to form the white precipitate of barium carbonate. After the same workup procedure described in example 20, 429 mg of barium carbonate was obtained and the yield of carbon dioxide is 78%.

EXAMPLE 23

The procedure of example 1 was repeated except that 36 mg of polyvinyl chloride powder was suspended in the reaction solution instead of 4-hydroxybenzoic acid and 23 ml of 0.1N NaOH aqueous solution was used to trap carbon dioxide. After the reaction solution was electrolyzed for 18 h, the unreacted polyvinyl chloride suspended in the reaction solution was recovered in 12 mg and 274 mg of barium chloride dihydrate was added in the trapping vessel of NaOH aqueous solution to form the white precipitate of barium carbonate. After the same workup procedure described in example 1, 118 mg of barium carbonate was obtained and the yield of carbon dioxide is 80%.

EXAMPLE 24

The procedure of example 8 was repeated except that an electrolytic system was performed with a graphite auxiliary electrode instead of a platinum auxiliary electrode, and pH was adjusted to 1 by using 12N HCl solution. Barium carbonate (422 mg) was obtained and the yield of carbon dioxide is 55%.

According to the present invention, many kinds of organic pollutants can be electrochemically decomposed to carbon dioxide with ease, safe, economic, and without generation of secondary wastes.

What is claimed is:

1. A process for decomposing an organic compound selected from the group consisting of aliphatic hydrocarbons, aromatic hydrocarbons, halogenated aliphatics, halogenated aromatics, aliphatic oxo-compounds, aromatic oxo-compounds, nitrogen-containing aliphatic compounds, nitrogen-containing aromatic compounds, and sulfur-containing compounds comprising:

(a) putting said organic compound in an acidic solution to form a reaction solution having a pH value of less than 7; and (b) using an electrolytic system having a working electrode, said working electrode is a graphite-containing electrode, to electrolyze said reaction solution in contact with an oxygen-containing gas which is dioxygen gas or air and at a reductive potential or current.

2. The process of claim 1, wherein said electrolytic system further comprises a Ag/AgCl reference electrode, and said reductive potential is at a range between −0.1 and −1.0 V.

3. The process of claim 1, wherein said reductive current is more negative than −10 mA.

4. The process of claim 1, wherein said acidic solution is an inorganic acid solution, said inorganic acid is selected from the group consisting of hydrochloric acid, sulfuric acid, nitric acid, phosphoric acid, and perchloric acid.

5. The process of claim 1, wherein the pH value of the reaction solution is at 0.5–6.0.

6. The process of claim 1, wherein said acidic solution is an acidic aqueous solution.

7. The process of claim 6, wherein said acidic aqueous solution further comprises a miscible organic solvent selected from the group consisting of methanol, ethanol, propanol, acetone, 2-butanone, acetonitrile, N,N-dimethylformamide, and dimethylsulfoxide.

8. The process of claim 1, wherein said reaction solution further comprises a supporting electrolyte selected from the group consisting of sodium chloride and potassium chloride.

9. The process of claim 1, wherein said halogenated aromatics is 2,4,6-trichlorophenol, pentachlorophenol, dioxins or, 2,3,4,5-tetrachlorobiphenyl.

10. The process of claim 1, wherein said electrolytic system is a two-electrode system comprising an auxiliary electrode and said working electrode.

11. The process of claim 1, wherein said electrolytic system is a three-electrode system comprising a reference electrode, an auxiliary electrode and said working electrode.

12. A process for decomposing an organic compound selected from the group consisting of aliphatic hydrocarbons, aromatic hydrocarbons, halogenated aliphatics, halogenated aromatics, aliphatic oxo-compounds, aromatic oxo-compounds, nitrogen-containing aliphatic compounds, nitrogen-containing aromatic compounds, and sulfur-containing compounds comprising:

(a) putting said organic compound in an acidic aqueous solution to form a reaction solution having a pH value of less than 7; and (b) using an electrolytic system having a working electrode, said working electrode is a graphite-containing electrode, to electrolyze said reaction solution in contact with an oxygen-containing gas and at a reductive potential or current.

13. The process of claim 12, wherein said electrolytic system further comprises a Ag/AgCl reference electrode, and said reductive potential is at a range between −0.1 and −1.0 V.

14. The process of claim 12, wherein said reductive current is more negative than −10 mA.

15. The process of claim 12, wherein said acidic solution is an inorganic acid solution, said inorganic acid is selected from the group consisting of hydrochloric acid, sulfuric acid, nitric acid, phosphoric acid, and perchloric acid.

16. The process of claim 12, wherein the pH value of the reaction solution is at 0.5–6.0.

17. The process of claim 12, wherein said oxygen-containing gas is dioxygen gas or air.

18. The process of claim 12, wherein said acidic aqueous solution further comprises a miscible organic solvent selected from the group consisting of methanol, ethanol, propanol, acetone, 2-butanone, acetonitrile, N, N-dimethylformamide, and dimethylsulfoxide.

19. The process of claim 12, wherein said reaction solution further comprises a supporting electrolyte selected from the group consisting of sodium chloride and potassium chloride.

20. The process of claim 12, wherein said halogenated aromatic is 2, 4, 6-trichlorophenol, pentachlorophenol, dioxins, or 2, 3, 4, 5-tetrachlorobiphenyl.

21. The process of claim 12, wherein said electrolytic system is a two-electrode system comprising an auxiliary electrode and said working electrode.

22. The process of claim 12, wherein said electrolytic system is a three electrode system comprising a reference electrode, an auxiliary electrode and said working electrode.

* * * * *